(12) United States Patent
Rahman et al.

(10) Patent No.: US 11,870,638 B1
(45) Date of Patent: Jan. 9, 2024

(54) NETWORK RESILIENCY AND IMPACT COORDINATION

(71) Applicant: AT&T Intellectual Property I, L.P., Atlanta, GA (US)

(72) Inventors: Moshiur Rahman, Marlboro, NJ (US); David H. Lu, Morganville, NJ (US); Eshrat Huda, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/956,118

(22) Filed: Sep. 29, 2022

(51) Int. Cl.
| | | |
|---|---|---|
| *H04L 12/00* | (2006.01) | |
| *H04L 41/0663* | (2022.01) | |
| *H04L 41/16* | (2022.01) | |
| *H04L 41/0677* | (2022.01) | |

(52) U.S. Cl.
CPC ...... *H04L 41/0663* (2013.01); *H04L 41/0677* (2013.01); *H04L 41/16* (2013.01)

(58) Field of Classification Search
CPC .. H04L 41/0663; H04L 41/16; H04L 41/0677
USPC ................................................. 709/223–224
See application file for complete search history.

(56) References Cited

U.S. PATENT DOCUMENTS

| | | | | |
|---|---|---|---|---|
| 5,333,308 | A * | 7/1994 | Ananthanpillai | ... H04L 43/0817 714/4.12 |
| 9,032,064 | B1 * | 5/2015 | Hendon | ............... H04L 43/0817 709/224 |
| 9,258,184 | B1 * | 2/2016 | Hendon | ................ H04L 69/327 |
| 2008/0247320 | A1 * | 10/2008 | Grah | .................... H04L 41/5012 370/241 |

FOREIGN PATENT DOCUMENTS

| | | | | |
|---|---|---|---|---|
| EP | 2129076 | A1 * | 12/2009 | ........... G06F 21/316 |
| WO | WO-2015197120 | A1 * | 12/2015 | ............. H04L 41/12 |

\* cited by examiner

*Primary Examiner* — Frantz Coby
(74) *Attorney, Agent, or Firm* — Guntin & Gust, PLC; John G. Rauch

(57) ABSTRACT

Aspects of the subject disclosure may include, for example, monitoring status of a network configured to provide end-to-end delivery of services to priority user equipment authorized according to a prioritized class of service and other user equipment not authorized for the prioritized class of service. The prioritized class of service extends a reserved network capacity for end-to-end delivery of a service via first domain including first network slices and a second domain including second network slices. A network interruption compromising the reserved capacity is determined based on the monitored status and integration of an alternate group of slices into one of the first network domain, the second network domain, or both to replace the compromised group of slices, is orchestrated. Integration of the alternate group of slices restores reserved network capacity according to the prioritized class of service. Other embodiments are disclosed.

20 Claims, 8 Drawing Sheets

300

US 11,870,638 B1

NETWORK RESILIENCY AND IMPACT COORDINATION

FIELD OF THE DISCLOSURE

The subject disclosure relates to a network resiliency and impact coordination.

BACKGROUND

First responders, such as police, fire, emergency medical technicians, the national guard, routinely operate in harsh and dangerous environments. These environments may include low-visibility conditions, as may result from smoke, dust, low light, toxic conditions, as may result from gas leakage or chemical spills, other compromising conditions as may result from collapsed buildings. For example, when first responder rescue teams locate victims, they need to act fast, e.g., to evaluate the victim's condition, to administer first aid and/or to transfer them to a hospital. Critical to the success of emergency services are secure and reliable communications. At least some first responders may operate their own, private communication networks, such as police and fire radio communications, but these systems may be limited in coverage and types of service, e.g., voice but no data.

Currently deployed public mobile communication networks offer generally reliable coverage over wide areas. Indeed, first responders may utilize services over these networks, such as communications, imagery, location services, command, and control, and the like. At least some efforts are underway to enhance the availability of public network resources for first responders. For example, in the U.S., there are two systems deployed in 4G commercial cellular networks that support emergency communications. One system is referred to as Wireless Priority Service (WPS), which is funded and overseen by the Department of Homeland Security (DHS). WPS uses priority mechanisms to increase a likelihood of establishing and maintaining voice communications over many wireless carriers within the U.S during times of congested conditions. The other system is referred to as FirstNet, primarily aimed at first responders.

BRIEF DESCRIPTION OF THE DRAWINGS

Reference will now be made to the accompanying drawings, which are not necessarily drawn to scale, and wherein.

DETAILED DESCRIPTION

Figure 1:
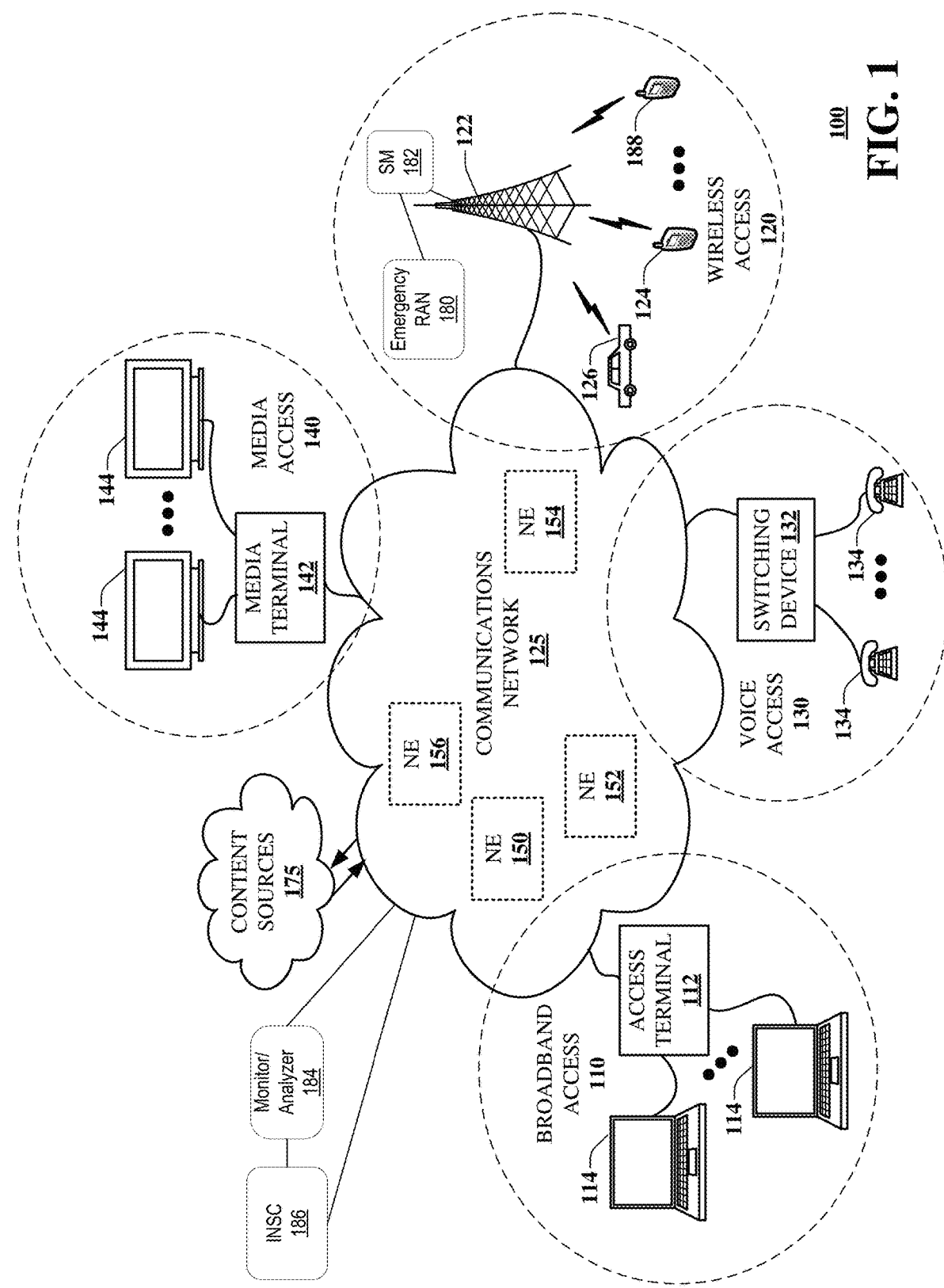
FIG. 1 is a block diagram illustrating an exemplary, non-limiting embodiment of a communications network in accordance with various aspects described herein.

The subject disclosure describes, among other things, illustrative embodiments for monitoring status of a network that delivers services to user equipment including priority user equipment authorized according to a prioritized class of service that extends an assured level of network capacity. To the extent that the monitoring identifies a network condition that compromises the assured level of network capacity, alternate equipment, such as an alternate group of network slices, may be orchestrated to replace the compromised group of slices, ensuring service availability in view of the network condition. Other embodiments are described in the subject disclosure.

One or more aspects of the subject disclosure include a process that includes monitoring, by a processing system including a processor, a status of a mobile network configured to provide an end-to-end delivery of services to priority mobile devices authorized according to a prioritized class of service and other mobile devices not authorized for the prioritized class of service. The prioritized class of service includes a reserved network capacity. The end-to-end delivery of a services utilizes a first network domain comprising a first plurality of network slices and a second network domain comprising a second plurality of network slices. The process further includes detecting, by the processing system, a network interruption based on the status of the network, wherein the reserved network capacity is compromised by the network interruption. A compromised group of slices of one of the first network domain, the second network domain, or both, associated with the network interruption, is identified, by the processing system. Integration of an alternate group of slices into one of the first network domain, the second network domain, or both to replace the compromised group of slices is orchestrated, by the processing system. The integration of the alternate group of slices restores the reserved network capacity for end-to-end delivery of services to the priority mobile devices according to the prioritized class of service.

One or more aspects of the subject disclosure include a system that includes a processing system including a processor and a memory that stores executable instructions. The instructions, when executed by the processing system, facilitate performance of operations that include monitoring operation of a communication network. The communication network is configured to provide end-to-end delivery of services to priority user equipment authorized according to a prioritized class of service and other user equipment not authorized for the prioritized class of service, wherein the prioritized class of service comprises a reserved communication network capacity, and wherein an end-to-end delivery of a service comprises a first communication network domain comprising a first plurality of network slices and a second communication network domain comprising a second plurality of network slices. A communication network interruption is determined based on the monitoring, wherein the reserved communication network capacity is compromised by the communication network interruption. A group of slices of one of the first communication network domain, the second communication network domain, or both, is identified to obtain an identified group of slices associated with the communication network interruption. An alternate group of slices configured for providing one of the first communication network domain, the second communication network domain, or both, is provided to replace the identified group of slices, wherein the alternate group of slices restores the reserved communication network capacity for end-to-end delivery of services to the priority user equipment according to the prioritized class of service.

One or more aspects of the subject disclosure include a non-transitory, machine-readable medium, that includes executable instructions. The instructions, when executed by a processing system including a processor, facilitate performance of operations that include monitoring a status of a network. The network is configured to provide end-to-end delivery of services to priority user equipment authorized according to a prioritized class of service and other user equipment not authorized for the prioritized class of service, wherein the prioritized class of service comprises a reserved network capacity, and wherein an end-to-end delivery of a service comprises a first network domain comprising a first plurality of network slices and a second network domain comprising a second plurality of network slices. A network interruption is determined based on the status of the network, wherein the reserved network capacity is compromised by the network interruption. A compromised group of slices of one of the first network domain, the second network domain, or both, associated with the network interruption, is identified and an integration of an alternate group of slices into one of the first network domain, the second network domain, or both, is orchestrated to replace the compromised group of slices. Integration of the alternate group of slices restores the reserved network capacity for end-to-end delivery of services to the priority user equipment according to the prioritized class of service.

Cellular communication is a critical tool in supporting the activities of first responders during an emergency. The difficulty, and at times inability, to communicate through cellular networks typically stems through either congestion due to flash crowds or from damaged infrastructure caused by natural disasters or malicious attacks. We also do not rule out the possibility of denial-of-service attacks from criminal and nation-state actors.

Compounding these problems, disasters and flash crowds are amorphous, whose characteristics can change suddenly over various time periods. Hence, it becomes a difficult challenge, if not impossible, to statically configure networks in anticipation of these changes to support an influx of first responders within a geographic region covering one or more cell tower sectors. This is where the disclosed techniques assist by providing a policy-based intelligent, machine-learning enabled central entity, such as an intelligent network slice controller, to route fist-responder calls over slices of an alternate pool of slices on-demand. The techniques disclosed herein facilitate selection and/or invocation or orchestration of alternate radio, RAN and/or core slices, and possible others, such as transport and/or edge network slices, for first-responder communication services on-demand.

By way of example, it is reported that New York City Police Department has approximately 38,000 uniformed officers and its Fire Department has over 15,000 uniformed firefighters, emergency medical technicians, and paramedics. Concentrations of these collections of first responders would place a strain on any public cellular infrastructures. To the extent that sufficient network resources, such as slices, are not available, mission critical emergency services needed for the first responders themselves may be denied. Even if first responders utilize their team-dedicated communication systems, the cross communication between different first responder teams, and the central operation control and management of all units, are necessary for successful and efficient mission accomplishment. Also, should any underlying infrastructure that a first responders' dedicated network ride on be down and/or otherwise adversely affected then all first-responder communications could be unavailable.

Consequently, the techniques disclosed herein extend reliable first responder service over commercial mobile communication networks. First responder services may be accessed remotely, via a supporting mobile communications network. The supporting communication network may establish an end-to-end network path for the exchange of related service information between mobile equipment of first responders and back-end equipment of corresponding service providers. A mobile communication device may be capable of engaging in multiple different services, that may operate substantially simultaneously, with message traffic of each service traversing a respective end-to-end network path. Message traffic may include one or more of control and/or forwarding messages, sometimes referred to as a control plane, user data messages, sometimes referred to as a data plane, or some combination of both.

It is further envisioned that in at least some embodiments, the supporting mobile communications network may include several different segments or domains. Each domain may support an exchange of messages, e.g., packets, over a respective portion of an end-to-end network path. Example segments may include, without limitation, an access segment, e.g., a radio access network (RAN) configured to exchange wireless messages between a radio transceiver and the first responder user equipment, a core network segment, that may be adapted to manage network functions, such as mobility functions, authentication, billing, as well as interconnections to other networks including local telephone exchanges, and/or wide area networks, such as the Internet. Core network equipment may be located at a centralized location and/or at a remote location. In either situation the core network is in communication with any number of geographically dispersed radio access segments. In at least some embodiments, the network may include a transport segment, e.g., configured to exchange messages between the radio access network segment and the core network segment.

An end-to-end network path that crosses multiple different segments or domains, may be referred to as being vertical. For example, an end-to-end path from a core network extending to the radio access network via an intervening transport network may be referred to as being a vertical path or vertical slice of the network. Each domain may be configured with a corresponding group of network slices that may be referred to as being horizontal, i.e., within the same domain. In at least some embodiments, messages may be exchanged between different devices within a domain. To the extent an end-to-end path includes a message exchange occurring within the same domain, at least that portion of the end-to-end path may also be referred to as being horizontal.

In at least some embodiments, the various processes, devices, systems and/or software disclosed herein may be adapted to dynamically identify alternate, cross-segment end-to-end network paths to support a prioritized service extended to first-responder communications. To the extent that the techniques are applied in a network that has adopted a slicing approach to network management, e.g., as in a 5G network, the cross-segment, end-to-end network paths may traverse different 5G network slice(s). An end-to-end path traversing multiple different segments may be required to ensure that existing first-responder communications are preserved and/or to ensure that a planned, required and/or otherwise provisioned reserve network capacity is reserved in a standby capacity to accommodate yet-to-be initiated first-responder communications.

Understandably, first-responder communications may be critical in administering first-responder services during a disaster scenario, such as in an extreme weather event, such as a storm, a flood, an earthquake and/or a wildfire. In at least some instances, it may be possible to predict emergency conditions, as in storms, which may be predicted by weather forecasts, tsunamis that may be expected after seismic events, and/or civil unrest which may be anticipated in response to a widely reported news event and/or court decision. Many other emergency conditions, however, may come with little or no warning, such as earthquakes and/or wildfires. Still other events, which may impact network availability, may include scheduled events, such as sporting events, conventions, vacation surges, rush hour, and the like. It is likely that any of the foregoing examples may result in a surge in network traffic or demand, that may result in an outage on the network and/or an unavailability of reserved network resources, e.g., bandwidth.

Alternatively, or in addition, network service impacts may result from equipment unavailability as may result from communication equipment damaged by a natural event, such as a storm, an earthquake, a fire. Other scenarios may arise in which equipment may be rendered inoperable by a power outage and/or equipment damage, routinely encountered during construction season, e.g., the summer months, in which it is much more likely that a wire, fiber or cable may be unintentionally severed by construction equipment. Still other opportunities for network outages may arise from malicious attacks, sabotage, wars, and/or denial-of-service attacks from criminal and/or nation-state actors.

In at least some embodiments, the network monitoring, reconfiguration and/or restorative system elements may employ security measures. Security measure may include, without limitation, physical security measures of physical assets, such as locked equipment rooms or cabinets, protective fences, surveillance, and the like. Alternatively, or in addition, message traffic related to one or more of the network monitoring, reconfiguration and/or restorative processes may employ secure measures, such as authorization processes, and/or message encryption. In at least some embodiments, network monitoring, reconfiguration and/or restorative measures may be enabled a secure monitoring and/or orchestration that leverages quantum measures, e.g., quantum communications and/or quantum processing. For example, one or more network monitoring and/or configuration devices may be equipped with a quantum networking interface adapted to support an exchange of quantum state information in preparation for and/or responsive to a disaster recovery. In at least some embodiments, the quantum state information may be utilized in combination with an exchange of encryption keys to provide a quantum encryption capability.

Beneficially, the network monitoring, reconfiguration and/or restorative measures disclosed herein may provide for a dynamic reconfiguration, e.g., a dynamic alternate slice configuration adapted to ensure first-responder communication service requirements are maintained. Such measures may be utilized to ensure and/or otherwise guarantee at least some minimum level of network bandwidth and/or services by first-responder equipment. To the extent that network bandwidth from a normal and/or traditional network slice pool becomes unavailable during any surge and/or disaster, the disclosed techniques may be employed to search, locate and/or otherwise identify alternate network resources. It is envisioned that in at least some scenarios, the alternate network resources may include unconventional resources, e.g., cross-segment slices, such as, a deployable cell cite, referred to as a "cell-on-truck" (CONT), a satellite terminal and/or link, and/or a drone platform.

As described further below, a network adapted to ensure a minimum level of FR service may include at least one intelligent unit that may be a central unit, such as an intelligent network slice controller (INSC) and/or analytics processor. The disclosed alternate slices may be selected on-demand from some or all available vertical and/or horizontal segments involved in an end-to-end path. The selections may be determined, as needed, including, radio assets, RAN assets, transport assets, edge network assets, and/or core assets. To the extent that a bandwidth availability may be compromised for these respective network segment slices supporting first-responder equipment. The disclosed techniques may be employed within a network to ensure that a guaranteed minimum number, bandwidth and/or scope of network access requests to authorized first responder equipment access requests will not be denied under virtually any circumstances. It is conceivable that there may be at least some gap in service, e.g., should it be necessary to relocate and/or otherwise integrate unconventional, alternate network resources.

Referring now to FIG. 1, a block diagram is shown illustrating an example, non-limiting embodiment of a communications network 100 in accordance with various aspects described herein. For example, communications network 100 can facilitate in whole or in part monitoring status of a network that delivers services to user equipment including priority user equipment authorized according to a prioritized class of service that extends a reserved network capacity to ensure service availability. To the extent that the monitoring identifies a network condition that compromises the ensured service availability, integration of an alternate group of slices is orchestrated to replace the compromised group of slices to ensure service availability in view of the network condition. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example communications network 100 includes a network monitor 184 in communication with one or more elements of the communications network 100, e.g., via the communications network 125. The example communications network 100 also includes a network re-configuration controller, which in at least some embodiments that utilize network slicing, may be referred to as an intelligent network configuration controller 186. The intelligent network configuration controller 186 may be in communication with one or more elements of the communications network 100, e.g., via the communications network 125 and in further communication with the network monitor 184. Continuing with the illustrative example, the wireless access 120 portion of the example communications network 100 includes a slice manager 182 in communication with the base station or access point 122. In at least some embodiments, the slice manager 182 may be in further communication with alternate network resources, e.g., an emergency RAN 180, that may include unconventional resources, such as the example deployable cell sites.

In at least some embodiments, the slice manager 182 may provide a software component that manages some or all management and/or orchestration entities of an assigned infrastructure. Without limitation, the examples provided herein disclosed slice management at a network domain level. In addition, the slice manager 182 may provide an interface for creating, modifying, monitoring, and/or otherwise deleting slices. Through a "north-bound" interface (NBI), the slice manager 182may interact with either a coordination layer and/or directly with a network operator, e.g., the intelligent network slice controller 234. The slice manager 182 may receive a network slice template (NEST), which describes slice details corresponding to one or more service requirements. The NEST may include details such as one or more of a list of network function virtualization (NFV) components, e.g., network services, that need to be instantiated, a wide area network (WAN) configuration, QoS, monitoring level, life-cycle stages, etc. The NEST may follow a mobile networking standard, such as a 5G standard, generic slice template. In at least some embodiments, the slice manager 230, 232 may map such details to specific actions for provisioning network slices. The slice manager 230, 232 may also exposes an API interface for management and/or monitoring of some or all slice instances. Through a "south-bound" interface (SBI), the slice manager 230, 232 may interface to the components of a management and orchestration layer (MANO), namely an NFV orchestrator (NFVO), an element management system (EMS) and a WAN infrastructure manager (WIM), to control some or all devices on a data plane.

In operation, the network monitor 184 may monitor status of the example communications network 100 adapted to provide end-to-end delivery of services to priority mobile devices 188 authorized according to a prioritized class of service and other mobile devices 124, 126 not authorized for the prioritized class of service that may include a reserved capacity of network resources, e.g., network bandwidth, set aside for a minimum guaranteed level of first-responder support. In some embodiments, the network monitor 184 may include a network analyzer adapted to analyze a status of the network, e.g., based at least in port on the monitored status. Alternatively, or in addition, the intelligent network configuration controller 186 network analyzer adapted to analyze a status of the network, e.g., based at least in part on the monitored status.

The monitored status may include, without limitation, one or more of self-reported status provided by one or more network equipment of the example system 100. Self-reported information may include, without limitation, an equipment power on/off status, an equipment, module and/or slice ready status indicating that the network element is ready for service, a fault status indicating whether the network element may have experienced a fault condition, a bandwidth utilization, a number of users served, quality of service (QoS) available, a QoS provided to other users, a measure of available capacity, e.g., bandwidth, a battery status, e.g., indicating an amount of available stored power, a measure of network congestion, a signal-to-noise ratio (SNR), a measure of interference, e.g., signal-plus-interference-to-noise (SINAR), error rates, error correction statistics, and so on.

It is understood that for large and/or complex communication networks, such as the example communications network 100, it may not be immediately obvious when an error and/or other comprise to network resources is encountered. In at least some embodiments, the network analyzer 184 may include data analytics adapted to analyze large volumes of network status data to identify comprised network equipment, devices and/or network conditions likely to compromise first-responder services, including preservation of reserved network capacity. Such analytics may utilize network status information obtained from an expansive network, such as public networks serving cities, states, regions, and/or nations. Data analysis may include correlations of network status, e.g., conditions, at and/or prior to an experienced outage and/or otherwise compromised network status. It is understood that compromised network status may include situations in which any portion of network capacity reserved for first-responder services may have been interrupted and/or otherwise reduced. Data analytics may be further employed to draw correlations and inferences that may be employed to currently monitored data, e.g., to formulate indications of a compromised condition and/or a prediction that such a compromise may be likely. Alternatively, or in addition, the network analyzer may employ machine learning and/or artificial intelligence adapted to identify and/or otherwise predict network conditions that compromise delivery of first-responder network services.

The intelligent network configuration controller 186 may receive from the network analyzer an indication of a current and/or predicted network conditions that compromises and/or is likely to compromise delivery of first-responder network services, including any first-responder required preservation of network capacity. The intelligent network configuration controller 186 may be configured with logic and/or intelligence that associates one or more network elements with the detected and/or predicted conditions. For example, in a communications network 125 that implements slicing, the intelligent network configuration controller 186 may be referred to as an intelligent network slice controller that associates one or more network slices with the detected and/or predicted conditions. In at least some embodiments, the intelligent network configuration controller 186 may be further configured to associate one or more end-to-end network paths representing active network service sessions and/or network capacity reserved for FR services.

Alternatively, or in addition, the intelligent network configuration controller 186 may be further adapted to identify one or more alternative network elements and/or slices that may be reconfigured to restore an existing network service and/or network capacity reserved for first-responder services. For example, the alternative network elements and/or slices may be obtained via so-called pools of such devices. Consider a number of instantiates slices available in a network segment, such as a RAN. Some of the slices may be utilized, while others remain at the ready for a reconfiguration or orchestration change requiring incorporation of a reserved, standby and/or otherwise pooled resource. It is worth noting there that any available alternative network resources may depend to at least some extent upon an associated service, QoS and/or requirement. According to network slicing, network resources may be allocated and/or otherwise configured in an efficient manner that may dictate slice configurations well suited for some services and/or applications, but not for others.

The intelligent network configuration controller 186 may obtain network configuration information, e.g., slice availability, utilization and/or reserve capacity from the slice manager 182. In at least some embodiments, the intelligent network configuration controller 186 may orchestrate an end-to-end network element or slice reconfiguration in combination with the slice manager 182, e.g., providing instructions to the slice manager 182, that reconfigures the network element and/or slice according to the instructions. For example, the intelligent network configuration controller 186 having been notified of a network condition that compromises a minimum level of assured first-responder capacity, may determine which element(s)/slice(s) are associated with the condition and which alternative element(s)/slice(s) may be available to support a reconfiguration of the end-to-end network path. In at least some embodiments, reserve element(s)/slice(s) may not be available at the ready, e.g., due to damaged equipment and/or loss of power. In such instances, the intelligent network configuration controller 186 and/or the slice manager may identify emergency and/or non-standard alternate network resources, e.g., the emergency RAN 180. The non-standard alternate network resources, e.g., the emergency RAN 180, may be acquired, relocated, activated and/or otherwise configured to provide an alternative network element(s)/slice(s) as may be necessary to reestablish any end-to-end network paths adapted to serve first-responder equipment.

Figure 2A:
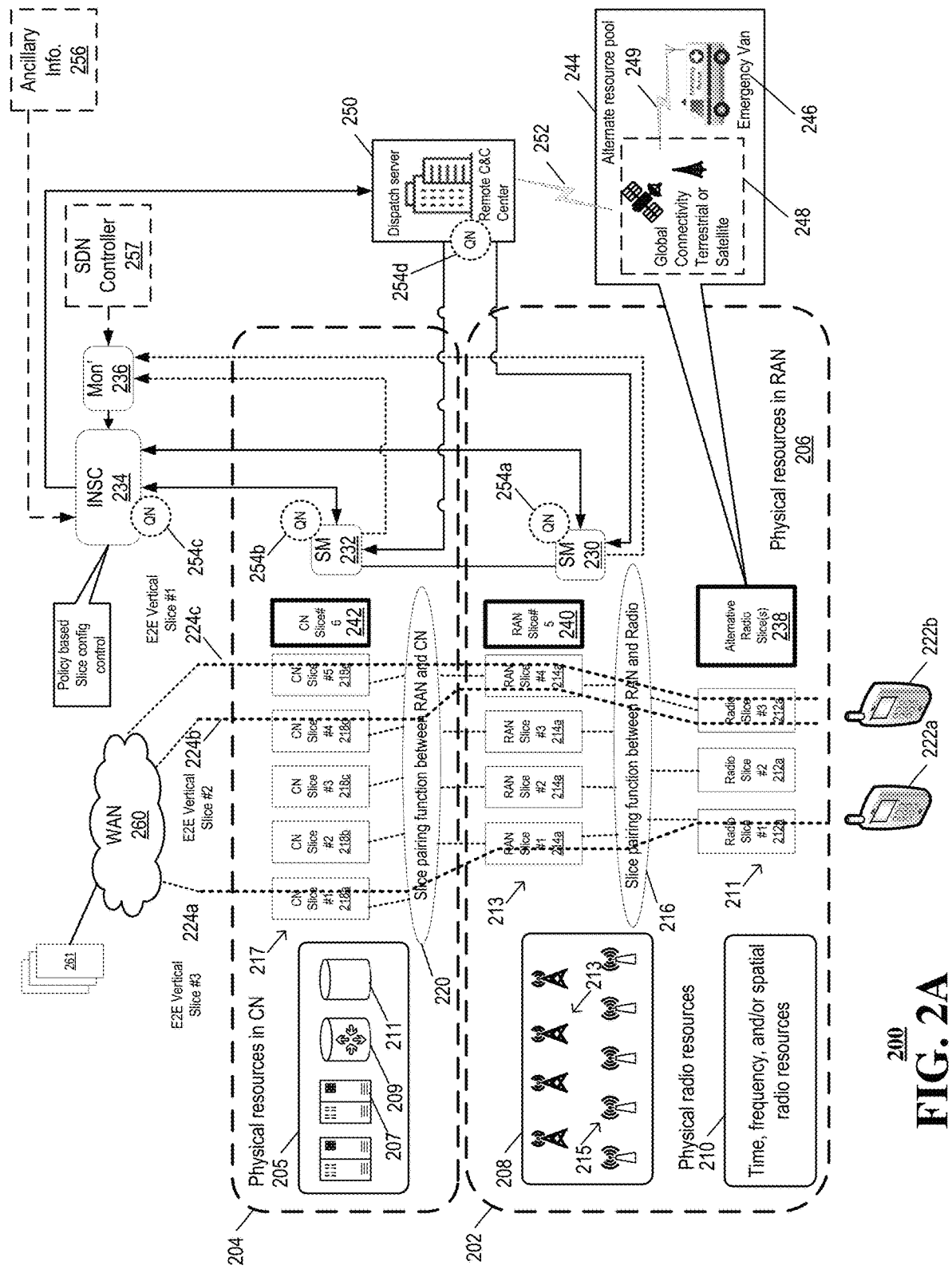
FIG. 2A is a block diagram illustrating an example, non-limiting embodiment of a resilient communication system functioning within the communications network of FIG. 1 in accordance with various aspects described herein.

FIG. 2A is a block diagram illustrating an example, non-limiting embodiment of a resilient communication system 200 functioning within the communications network 100 of FIG. 1. The resilient communication system 200 is configured to identify impacts to network operations that might otherwise compromise network access to a priority class of users, e.g., first responders, and to adapt the network as may be necessary to preserve and/or otherwise restore the network access, which may include a reserved network capacity and/or level of service. The example resilient communication system 200 includes multiple distinguishable segments, sometimes referred to as domains. The different domains may employ different physical infrastructure, apply different protocols, transport signals via different media, and so on. At least some end-to-end network paths traverse more than one of the different domains. The example resilient communication system 200 also incorporates a networking architecture that incorporates network "slicing." Network slicing enables a sharing, e.g., multiplexing, of virtualized and independent logical networks on the same physical network infrastructure.

Network slicing allows for the instantiation of multiple logical networks operating over the same physical network. The carrier can construct each of the logical networks to support a particular class of service (e.g., high bandwidth, low latency) or a type of device such as unmanned Internet of Things (IoT) or User Equipment (i.e., smart phones). The techniques and system architectures disclosed herein offer an alternate radio slice pool and/or segment, that may include deployable cell site equipment, satellite and/or terrestrial transport networks, and/or drone with slice pairing function by employing an intelligent central unit. As described further below, the slice monitoring, configuration and/or reconfiguration techniques may be backed by quantum enabled intelligent network slice controller and/or network monitor.

The illustrative example includes an access network domain 202. For wireless network access, the access network domain 202 may include radio access network (RAN) and a core network domain 204. The resilient communication system 200 orchestrates at least some end-to-end network paths that extend between end user devices, such as mobile phones, tablet devices, laptops, etc., referred to generally as user devices 222a, 222b, and a network accessible service.

Network accessible services may include, without limitation, communication services, e.g., VoIP, SMS, MMS, email. Alternatively, or in addition, network accessible services may include data services, e.g., file transfer services, web browsing services, data storage and/or retrieval services, audio and/or video streaming services, and so on. Example network accessible service may be represented by one or more back-end servers 261, which may be operated by one or more of a network service provider managing at least a portion of the resilient communication system 200, and/or an independent service provider. The one or more application servers, sometimes referred to as back-end servers 261, may be accessible via direct connections to the core network domain 204 and/or via indirection connections through one or more other network paths, e.g., via a wide area network (WAN) 260, such as the Internet. In particular, a first end-to-end network path 224a extends between a first user device 222a and one or more of the back-end servers 261, e.g., via the WAN 260. Likewise, second and third end-to-end network paths 224b, 224c, extend between a second user device 222b and the back-end servers 261 via the WAN 260.

In at least some embodiments, the mobile networks are configured across multiple different network segments or domains, each adapted for respective different network functions. According to a mobile communication network, an end-to-end link may extend between a first radio terminal and another service or server, e.g., a backend server, configured to provide a service to mobile user equipment over the end-to-end link. The radio terminal may be configured to provide wireless access to mobile user equipment within a corresponding wireless coverage area or region. Alternatively, or in addition, the end-to-end link may extend between the first radio terminal and a second radio terminal, via a mobile core network, e.g., to provide mobile-to-mobile communication service between two mobile devices that may be served by the same or different radio terminals.

According to the illustrative example, the second user device 222b may be associated with a priority class of users, such as first responder, whereas the first user device 222a may not be associated with the special class of users. It is envisioned that, without limitation, user classes may be distinguished by one or more of a subscription level, a user association, e.g., with a business and/or governmental agency, a type of user device, a QoS, a user device location. Accordingly, such classes may be defined and/or otherwise managed by a network service provider. In at least some instances, membership in and/or association of a user device with a priority class of users may require independent authorization. For example, identification of a user and/or user device with a first responder class of priority users may require authorization from an independent agency, such as the Department of Homeland Security.

Identification of a user device with a priority class may require a user authentication process. Such processes may include, without limitation, a registration and/or entry of user credentials. Credentials may include any form, such as username and password, security token, code or key, biometric identification, e.g., facial recognition, voice recognition, fingerprint, and the like. In at least some embodiments, the resilient communication system 200 may identify user equipment, e.g., the user devices 222a, 222b, generally 222, by a unique equipment identifier, such as the International Mobile Equipment Identity (IMEI) that uniquely identifies a device, and/or an International Mobile Subscriber Identification number (IMSI) that uniquely identifies a user, e.g., via a subscriber identity module (SIM) card and/or an Integrated Circuit Card ID (ICCID), a globally unique serial number—a one-of-a-kind signature that identifies the SIM card itself. Alternatively, or in addition, identifiers for the purpose of identifying a class of service may include In at least some embodiments, the access network domain 202 may include physical RAN resources 206, logical RAN resources, e.g., RAN slices, and/or some combination of both. The physical RAN resources 206 may include physical radio resources 210 that may be adapted to transmit and/or receive wireless signals according to one or more of time, frequency and/or spatial radio resources. For example, the physical radio resources 210 may be configured to restrict operations to licensed frequency bands that may be reserved in particular geographical regions. The physical radio resources 210 may be in communication with supporting RAN resources 208 that may include one or more antennas, e.g., cell towers, that may be adapted for operation in a prescribed frequency band according to a range or scope that may be categorized into one or more of macrocells, microcells, picocells and/or femtocells. Alternatively, or in addition, the supporting RAN resources 208 may include wireless access points 215 that, in at least some instances, may be adapted to operate in unlicensed frequency bands, e.g., according to wireless local area networks (LAN), such as those described by IEEE 802.11 technical standards, e.g., wireless fidelity (Wi-Fi), wireless personal area networks (PAN), such as those described by IEEE 802.15, e.g., Bluetooth, and so on.

In at least some embodiments, the physical RAN resources 206 may include and/or otherwise support logical RAN instances. According to the illustrative example, the physical RAN resources 206 supports a first group of radio slices 211. The first group of radio slices 211 includes a first radio slice 212a, a second radio slice 212b, and a third radio slice 212c. The radio slices 212a, 212b, 212c, generally 212, may be adapted for wireless transmission and/or reception. For example, the radio slices 212 may be adapted to operate in one or more definable frequency bands, according to one or more definable modulation types, possibly employing other definable features, such as encoding, e.g., error correction encoding, and the like. In at least some embodiments, one or more of the radio slices may be configured according to software defined radio principles.

The physical RAN resources 206 may further include a second group of RAN slices 213. The second group of RAN slices 213 includes a first RAN 214a, a second RAN slice 214b, a third RAN slice 214c, and a fourth RAN slice 214d. The RAN slices 214a, 214b, 214c, 214d, generally 214, may be adapted for wireless transmission and/or reception. In at least some embodiments, the RAN slices 214 are configured as radio controllers to be used in combination with the radio slices 212. For example, the RAN slices 214, in combination with the radio slices 212, may be adapted to operate over an air interface according to one or more definable RAN protocols, such as those defined in standards managed by the 3$^{rd}$ Generation Partnership Project (3GPP), e.g., Long Term Evolution (LTE), LTE Advanced, LTE Advanced Pro, 5G new radio (5G NR), 5G, 5G Advanced, 6G, and the like. The RAN protocols may facilitate wireless access by the user devices 222, and/or management of other functions, such as spectrum sharing, interference mitigation, and/or mobility of the user devices 222.

The example physical RAN resources 206 support a first slice pairing function 216. The first slice pairing function 216 is adapted to pair one or more of the logical RAN slices 214 with one or more of the logical radio slices 212. Such RAN-radio pairing may be managed according to one or more of demand, application and/or network service type, class of service, QoS, end user equipment capability and so on. It is envisioned one or more of the physical RAN resources 206, including one or more of the radio slices 212, the RAN slices 214 and/or the first slice pairing function 216 may be managed by a network controller.

In at least some embodiments, the core network domain 204 may include physical core network resources 205, logical core network resources, e.g., core network slices, and/or some combination of both. The physical core network resources 205 may include physical compute resources 207, physical network, e.g., routing, resources 209, and/or physical storage resources 201 that may be adapted to that may be adapted to perform core network functions, e.g., authorization, billing, lawful interception, mobility management, session management, transmission of packets between mobile devices 222 and back-end servers 261, and so on.

In at least some embodiments, the physical core network resources 205 may include and/or otherwise support logical core network instances. According to the illustrative example, the physical core network resources 205 supports a group of core network slices 217. The group of core network slices 217 includes a first core network slice 2182*a*, a second core network slice 218*b*, and a third core network slice 218*c*, a fourth core network slice 218*d*, and a fifth core network slice 218*e*. The core network slices 218*a*, 218*b*, 218*c*, 218*d*, 218*e*, generally 218, may be adapted for performing respective core network functions. For example, the core network slices 218 may be adapted to operate according to one or more definable mobile network core functions, e.g., according to 4G, LTE, LTE-Advanced, 5G, and/or 6G.

The example physical core network resources 205 support a second slice pairing function 220. The second slice pairing function 220 is adapted to pair one or more of the core network slices 218 with one or more of the logical RAN slices 214. Such core network-RAN pairing may be managed according to one or more of demand, application and/or network service type, class of service, QoS, end user equipment capability, and so on. It is envisioned one or more of the physical core network resources 205, including one or more of the core network slices 218 and/or the second slice pairing function 220 may be managed by a network controller.

A service-oriented view of a network may utilize one or more techniques commonly referred to as software-defined networking (SDN) and network function virtualization (NFV). These techniques facilitate an implementation of flexible and scalable network slices on top of a common network infrastructure. The common network infrastructure may be located together with a core network, at one or more edge networks, e.g., proximate to RANs and/or at any other convenient network accessible location. To this end, the example resilient communication system 200 may include a SDN controller 257, shown in phantom. In at least some embodiments, the SDN controller 257 may initiate and/or otherwise participate in orchestration of one or more of the example radio slices 212, RAN slices and/or core network slices 217. Alternatively, or in addition, the SDN controller 257 may define and/or otherwise configure one or more of the first and second slice pairing functions 216, 217.

For example, in some scenarios, the SDN controller 257 may configure at least some of the slices 212, 214, 218 responsive to demand. If there is no demand for a particular network accessible service that may require one or more specialized slice(s) 212, 214, 218, there may be no such slices orchestrated. However, should a demand occur and/or be otherwise anticipated, then the appropriate serving slice(s) 212, 214, 218 may be orchestrated at that time. Alternatively, or in addition, at least some slices 212, 214, 218 may be orchestrated in anticipate of a future demand, and/or maintained after a demand has ceased, the slices remaining in a slice pool, available to serve any future similar demands. It is further understood that at least some slices 212, 214, 218 of a common group of slices 211, 213, 21 may be redundant, e.g., to provide some elasticity for demand and/or reserve capacity. Alternatively, or in addition, at least some slices of a common group of slices 211, 213, 217, may differ to accommodate different services, end user devices, levels of service, and the like.

The example resilient communication system 200 includes examples of pooled slices. For example, the access network domain 202 includes one or more reserved and/or otherwise pooled RAN slices 240. Alternatively, or in addition, the access network domain 202 may include one or more reserved and/or otherwise pooled radio slices (not shown). Likewise, the core network domain 204 includes one or more reserved and/or otherwise pooled core network slices 242. Features of the pooled slices 240, 242 may be determined according to past usage, expected demand, network policies, and/or any combination thereof. It is understood that, in at least some embodiments, orchestration of any pooled slices 240, 242 may be directed by the SDN controller 257.

The example resilient communication system 200 is configured to provide three examples of end-to-end paths. A first end-to-end path 224*a* is referred to as a first end-to-end, vertical path, as it traverses different network domains. Namely, the first end-to-end path 224*a* supports a first corresponding network service that extends between the first user device 222*a* and a corresponding one of the back-end servers 261. Likewise, the second and third end-to-end paths 224*b*, 224*c* supports a second and third corresponding network services that extend between the second user device 222*b* and corresponding ones of the back-end servers 261. Each of the end-to-end, vertical paths 224*a*, 224*b*, 224*c*, generally 224, traverses each of the access network domain 202 and the core network domain 204.

Continuing with the illustrative example and according to the first end-to-end, vertical path 224*a*, the first slice pairing function 216 pairs the first radio slice 212*a* with the first RAN slice 214*a*, while the second slice pairing function 220 pairs the first RAN slice 214*a* with the first core network slice 218*a*. Similarly, according to the second end-to-end, vertical path 224*b* the first slice pairing function 216 pairs the third radio slice 212*c* with the fourth RAN slice 214*d*, while the second slice pairing function 220 pairs the fourth RAN slice 214*d* with the fourth core network slice 218*d*. Likewise, according to the third end-to-end, vertical path 224*c* the first slice pairing function 216 pairs the third radio slice 212*c* with the fourth RAN slice 214*d*, while the second slice pairing function 220 pairs the fourth RAN slice 214*d* with the fifth core network slice 218*e*.

The example resilient communication system 200 provides a resiliency architecture that includes a first slice monitor 230 configured to monitor orchestration, utilization, status, and the like, for slices 212, 214 of the access network domain 202. The resiliency architecture further includes a second slice monitor 232 configured to monitor orchestration, utilization, status, and the like, for slices 218 of the core network domain 204. To the extent that a resilient communication system includes one or more additional network domains, e.g., a transport domain, such other domains may be configured in a similar manner, e.g., including supporting physical resources that support configurations of logical slices that may be orchestrated as necessary and configured according to functionalities of the corresponding network domains. It is further understood that any other network domains may be similarly configured with slice pairing function(s) as may be necessary to configure end-to-end network paths, as well as slice monitors as may be necessary to monitor orchestration, utilization, status, and the like, of any such slices.

The example resilient communication system 200 further provides a network monitor 236. The network monitor 236 may receive input from one or more of the slice monitors 232, a SDN controller 257, when available, and in at least some embodiments, from the underlying physical resources 206, 205 and/or slices 212, 214, 218. It is understood that the SDN controller 25 may maintain a system wide view of related elements of the SDN. The network monitor 236 may be adapted to receive and/or interpret such input as may be indicative of a status of a portion or the whole of the resilient communication system 200. In at least some embodiments, the network monitor 236 may incorporate logic, e.g., according to pre-programmed functionality, to recognize and/or otherwise detect an adverse network condition, such as an equipment failure, a surge in network traffic, an increase in communication error, a reduction in other performance indicators, such as bandwidth utilization, SNR, BER, spare capacity, reliability, and so on. It is understood that the network monitor 236 may determine network issues, including anticipated issues, according to one or more of currently received status information, historical records of status information, past performance, e.g., past predictions, operation and maintenance data, and any other information that may facilitate recognition and/or anticipation of network issues that may impact current operations, future operations, including maintaining availability of a required reserved network capacity as may be beneficial for serving special classes of users, such as first responders.

In at least some embodiments, the network monitor 236 may include data analytics adapted to analyze large volumes of network status data to identify comprised network equipment, devices and/or network conditions. Such analytics may utilize network status information obtained from an expansive network, such as public networks serving cities, states, regions, and/or nations. Data analysis may include correlations of network status, e.g., conditions, at and/or prior to an experienced outage and/or otherwise compromised network status. Data analytics may be further employed to draw correlations and inferences that may be employed to currently monitored data, e.g., to formulate indications of a compromised condition and/or a prediction that such a compromise may be likely. Alternatively, or in addition, the network analyzer may employ machine learning and/or artificial intelligence adapted to identify and/or otherwise predict network issues, such as conditions that compromise delivery of first responder network services.

Machine learning may interpret historical records of monitored network status indicators, e.g., big data, and consequential network issues. The machine learning may be adapted to draw inferences and/or conclusions, such that patterns of monitored status may be recognized as indicators of a network issue and/or a condition that likely precedes a network issue. In at least some embodiments, the network monitor 236 incorporates artificial intelligence, e.g., according to a neural network, such as a deep-learning neural network. Such neural networks may be designed and/or otherwise trained according to training sets of data, to recognize network issues and/or conditions that likely precede network issues. A suitably trained deep neural network may process live monitored network status indicators and provide indications of a network issue and/or a condition that likely precedes a network issue. It is understood that a training process may be repeated periodically and/or be updated during use, e.g., by providing feedback as to the accuracy of any such reported network issue.

In at least some embodiments, the example resilient communication system 200 also includes a network re-configuration controller that in at least some applications may be referred to as an intelligent network configuration controller 234. The example intelligent network configuration controller 234 may be in communication with the network monitor 236 and one or more of the slice monitors 230, 232. In operation, the intelligent network configuration controller 234 may receive from the network monitor 236 an indication of a current and/or predicted network issue or condition that compromises and/or is likely to compromise delivery of network services, including any required preservation of network capacity for special classes of users, such as the first responders. The intelligent network configuration controller 234 may be configured with logic and/or intelligence that associates one or more network elements, e.g., slices 212, 214, 218 with the detected and/or predicted issues or conditions.

In at least some embodiments, the intelligent network configuration controller 234 may be further configured to associate one or more end-to-end network paths 258 representing active network service sessions and/or network capacity reserved for special classes of service. Alternatively, or in addition, the intelligent network configuration controller 234 may be further adapted to identify one or more alternative network elements and/or slices 212, 214, 218 that may be reconfigured to restore an existing network service and/or network capacity reserved for special classes of services. For example, the alternative network elements and/or slices may be obtained via so-called pools 240, 242 of such devices.

The intelligent network configuration controller 234 may obtain network configuration information, e.g., slice availability, utilization and/or reserve capacity from the slice managers 230, 232. In at least some embodiments, the intelligent network configuration controller 234 may orchestrate an end-to-end network element or slice reconfiguration in combination with the slice managers 230, 232, e.g., providing instructions to the slice managers 230, 232, that reconfigures the network element and/or slice according to the instructions. For example, the intelligent network configuration controller 234 having been notified of a network condition that compromises a minimum level of assured first responder capacity, may determine which element(s)/slice(s) are associated with the condition and which alternative element(s)/slice(s) may be available to support a reconfiguration of the end-to-end network path.

Figure 2B:
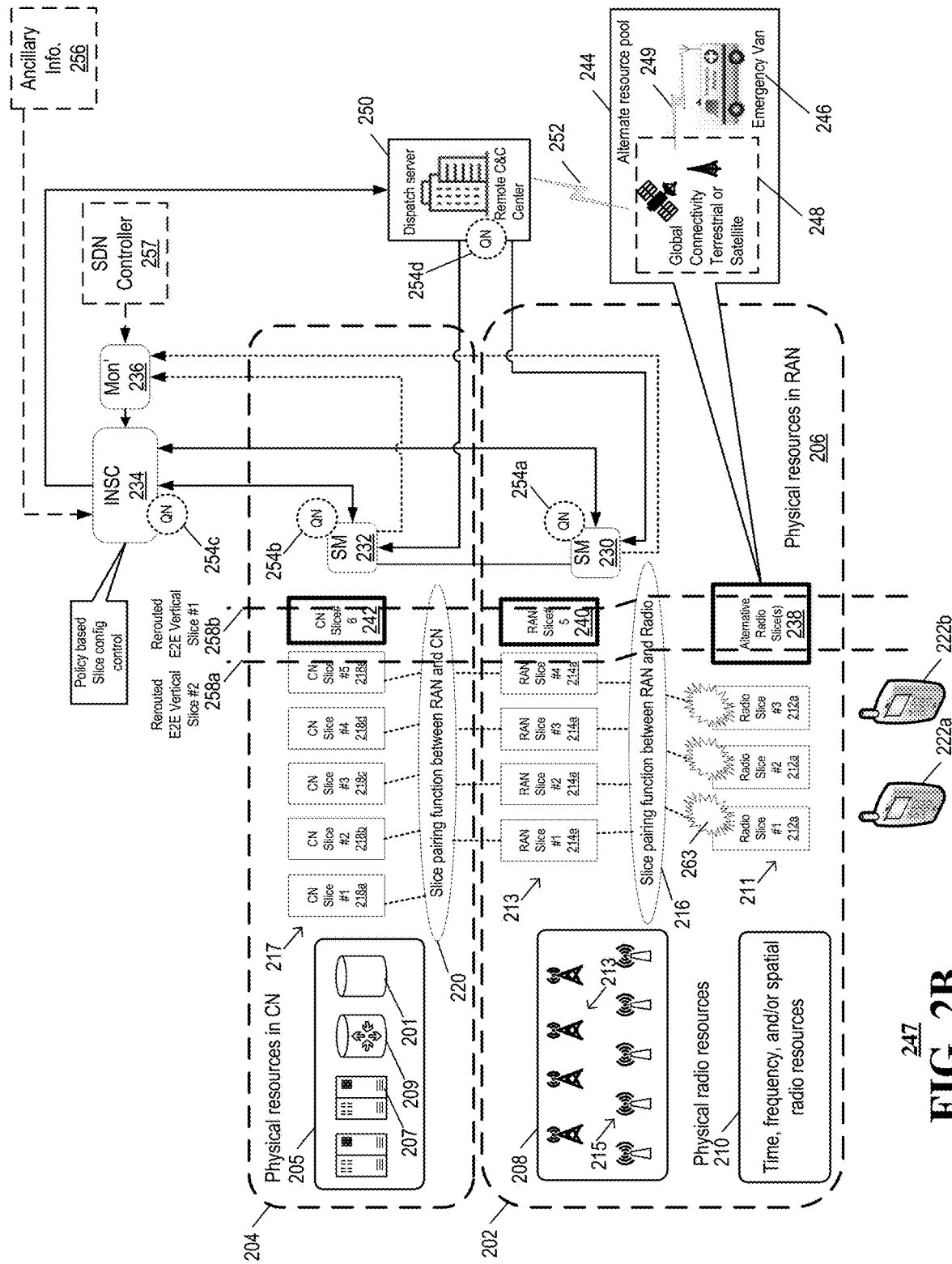
FIG. 2B is a block diagram illustrating an example, non-limiting embodiment of a resilient communication system functioning within the communications network of FIG. 1 in accordance with various aspects described herein.

FIG. 2B is a block diagram illustrating an example, non-limiting embodiment of a network resiliency and impact coordination system 247 functioning within the communication network of FIG. 1 in accordance with various aspects described herein. The example network resiliency and impact coordination system 247 represents a reconfiguration of the network resiliency and impact coordination system 200 of FIG. 2A. According to the illustrative example, the access network domain 202 has suffered an adverse event 263 that has rendered all slices 212 of the group of radio slices 211 inoperable. For example, the physical RAN resources supporting the group of radio slices 211 may have been damaged, e.g., as a result of a storm or a fire. Perhaps a power cable providing primary and backup power have been severed, e.g., by a wild animal. In any event, there remain no available orchestrated radio slices 212, nor can any additional radio slices 212 be orchestrated and/or otherwise instantiated at this location due to the physical damage. Consequently, the end-to-end, vertical paths 224 (FIG. 1) have been compromised, such any active services and/or reserved network capacity associated with the end-to-end, vertical paths 224 are no longer available.

In at least some embodiments, the network service provider may identify alternative radio resources 238 that may be utilized to provide the compromised functionality and to allow at least some of the network services, and particularly those associated with any special classes of users, such as first responders, to be restored. The restoration may be permanent but is more likely temporary until network repairs to any compromised equipment may be made to restore full and normal network operation. According to the illustrative example, the alternative radio resources 238 may include deployable radio equipment that may be transported to a suitable location to restore at least a portion of the compromised wireless network service. By way of nonlimiting example, deployable resources, e.g., from a pool of such deployable resources 244, may include radio equipment deployed on a vehicle 246, such as a mobile van or truck, sometimes referred to as "cell on a truck" (CONT). Other examples include radio equipment deployable on a drone, e.g., an aerial platform that may be deployed in an airborne manner to provide wireless coverage sufficient to restore at least a portion of the compromised wireless network service. Still other alternatives may include cell on a palette, in which a pallet or group of pallets may be deployed to a suitable location by truck and/or aerial drop.

In at least some embodiments, the alternative radio resources 238, such as the mobile van may be connected to and/or otherwise integrated into any existing physical RAN resources 206 that may remain operational. According to the illustrative example, the group of RAN slices 213 and the first slice pairing function remain operational, such that the alternative radio resources 238 may be interconnected. For example, the first slice pairing function 216 may pair the alternative radio resource 238 of the deployed vehicle to one or more surviving RAN slices 214. Once integrated in this manner, replacement end-to-end, vertical paths 224 may be orchestrated.

According to the illustrative example, a first reconfigured end-to-end, vertical path 258a, incorporates the alternative radio resources 238, the fourth RAN slice 214d and the fifth CN slice 218e. The first reconfigured end-to-end, vertical path 258a may represent a replacement of the second end-to-end, vertical path 224b, e.g., providing an equivalent level of service. Alternatively, or in addition, the reconfigured path 258a may provide an alternative level of service that may be configured to provide a portion of the original path 224b or perhaps a greater level of service, e.g., providing more bandwidth, more power, an improved QoS, etc.

According to the illustrative example, a second reconfigured end-to-end, vertical path 258b, may incorporate at least a portion of the alternative radio resources 238, together with a fifth RAN slice 214e and a sixth CN slice 218f. The second reconfigured end-to-end, vertical path 258b may represent a replacement of the third end-to-end, vertical path 224c, e.g., providing an equivalent level of service. Alter- natively, or in addition, the reconfigured path 258b may provide an alternative level of service that may be configured to provide a portion of the original path 224c or perhaps a greater level of service, e.g., providing more bandwidth, more power, an improved QoS, etc.

In at least some embodiments, the deployed vehicle 246 is in communication with a transport network 248, such as a satellite network and/or a terrestrial radio network and/or a cabled packet switched network and/or an optical network. The transport network 248 may provide a communication link to the physical RAN resources 206 of a quality and capacity that is sufficient to transport signals between the deployed vehicle 246 and the physical RAN resources 206. Alternatively, or in addition, the transport network 248 may provide a communication link to any other part of the network, such as the physical resources of the core network 205, having a quality and capacity that is sufficient to transport signals between the deployed vehicle 246 and the physical resources of the core network 205. In such instances, the deployed vehicle 246, together with the transport network 248, may serve as a complete, albeit temporary, access network domain 202. In at least some embodiments, a configurate of the alternative radio, RAN and/or transport network equipment may provide a suitable bandwidth and QoS to support at least a minimum network capacity and/or reserve to accommodate special class users, such as first responders.

In more detail, the example resiliency and impact coordination system 247 may include and/or otherwise be in communication with a remote command and control center 250. For example, the deployed vehicle 246 may be in communication with the transport network 248 via a local radio link 249, and/or a cabled or wired link, depending upon distances between the deployed vehicle 246 and the transport network 248. It is envisioned that in at least some embodiments, the deployed vehicle 246 may be equipped with a collocated satellite terminal to access the transport network 248. It is envisioned that the remote command and control center 250 may be in communication with the pool of alternate resources 244, e.g., via a wireless link 252 that may take advantage of any available remote transport network 248. Alternatively, or in addition, the remote command and control center 250 may be in communication with one or more the intelligent network configuration controller 234, possibly the network monitor 236 and/or the SDN controller 257 and/or one or more of the slice managers 254.

In at least some embodiments, the remote command and control center 250 may manage and/or otherwise control provisioning of one or more deployed vehicles 246 and/or other platforms of the pool of alternate resources 244. Such provisioning may include placing such deployed vehicles 246 at strategic locations to minimize any emergency deployment to compromised network regions. Such provisioning may be based on one or more of network architecture, e.g., locations of network equipment, such as the physical RAN resources 206, historical records that may indicate different likelihoods of the scheduled maintenance and/or failures.

In at least some embodiments one or more of the intelligent network configuration controller 234 and/or the remote command and control center 250 may be in communication with an external information source 256 that may provide ancillary information. Example external information source 256 may include the national weather service, e.g., providing predictions of storms, including winds, rain amounts, snow depths, and perhaps wildfire conditions, local traffic reporting service, local news outlets, the national emergency alert system (EAS), venue schedules, as they may relate to municipal festivals, sporting events, conventions, and the like. The intelligent network configuration controller 234 and/or the remote command and control center 250 may evaluate such ancillary information together with knowledge of the network conditions, network capacity reservation requirements, network demand, anticipated network demand, and so on. The intelligent network configuration controller 234 and/or the remote command and control center 250 may locate and/or otherwise evaluate the available pool of alternate resources 244 and develop a strategy for deployment of such limited resources at convenient locations adapted to expedite network reconfigurations and/or restorations as may be necessary respond to unplanned and/or planned events.

In at least some embodiments, reserve element(s)/slice(s), e.g., pooled slices 240, 242, including any pooled radio slices, may not be available at the ready, e.g., due to damaged equipment and/or loss of power. In such instances, the intelligent network configuration controller 234 and/or the slice manager230, 232 may identify emergency and/or non-standard alternate network resources, e.g., the emergency alternate radio slices 238, and/or emergency RAN service. The non-standard alternate network resources, e.g., the emergency RAN service, may be acquired, relocated, activated and/or otherwise configured to provide an alternative network element(s)/slice(s) as may be necessary to reestablish any end-to-end network paths adapted to serve FR equipment.

In at least some embodiments, network monitoring, reconfiguration and/or restorative measures may be enabled a secure monitoring and/or orchestration that leverages quantum measures, e.g., quantum communications and/or quantum processing. For example, one or more network monitoring and/or configuration devices may be equipped with a quantum networking interface, e.g., a quantum node, adapted to support an exchange of quantum state information in preparation for and/or responsive to a disaster recovery. In at least some embodiments, the quantum state information may be utilized in combination with an exchange of encryption keys to provide a quantum encryption capability. According to the example resiliency and impact coordination system 247, the intelligent network configuration controller 234 includes and/or has access to a local quantum node 254a. Likewise, each of the slice managers 230, 232 includes and/or has access to a local quantum node, 254a, 254b. To the extent that a remote command and control center 250 is utilized, a local quantum node 254d may be provided locally. The quantum nodes, 254a, 254b, 254c, 254d provide quantum elements, e.g., photons, that may be utilized to exchange quantum states in a secure manner. The quantum states may be used to implement secure communications between the quantum enabled devices in the interest of preventing eavesdropping and/or malicious attacks that might otherwise jeopardize first-responder activities.

Figure 2C:
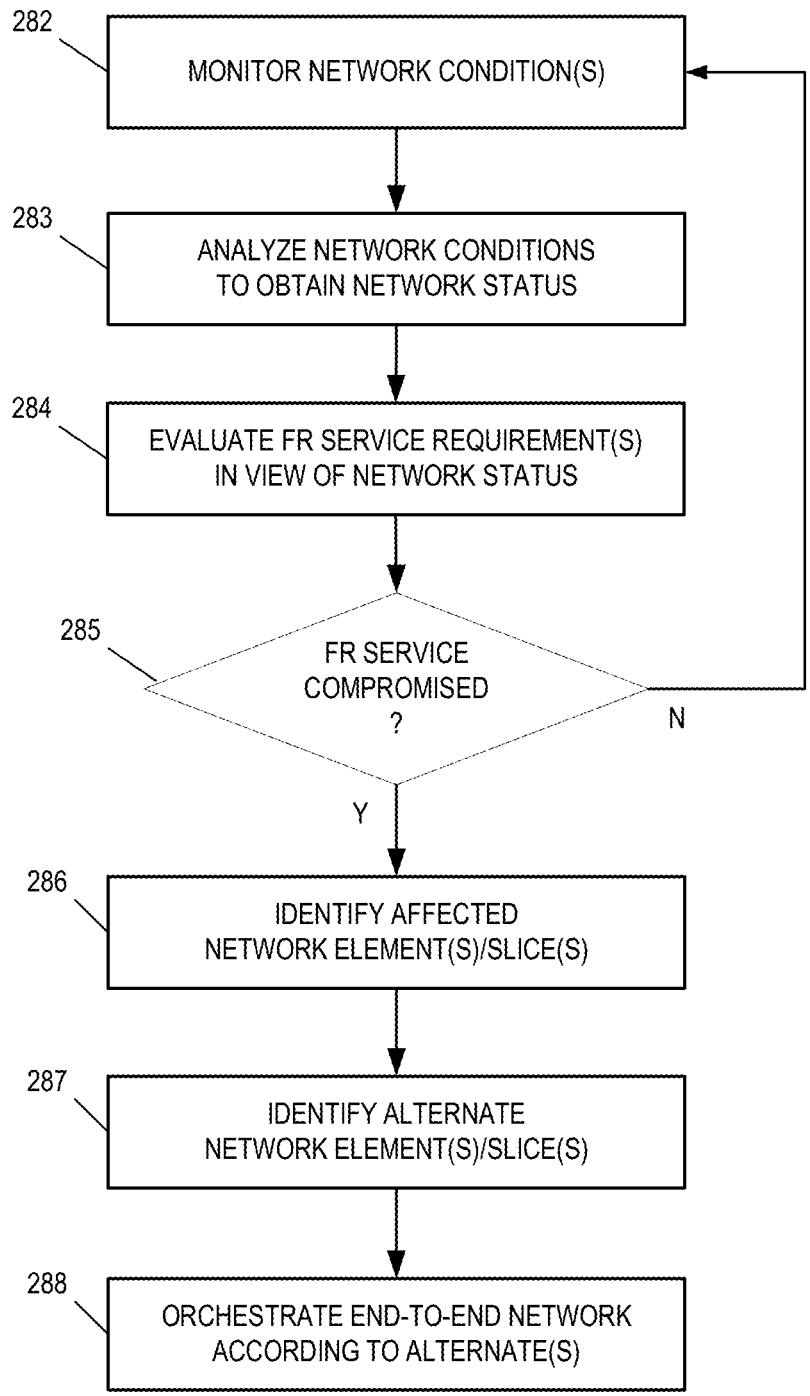
FIG. 2C depicts an illustrative embodiment of a network resiliency and impact coordination process in accordance with various aspects described herein.

FIG. 2C depicts an illustrative embodiment of a network resiliency and impact coordination process 280 in accordance with various aspects described herein. The process 280 monitors, at 282, one or more network conditions. Conditions may include bandwidth utilization, equipment status, dropped calls, stalled applications, message delay, communication errors, and so on.

The process 280 analyzes, at 283, the one or more network conditions to obtain a network status. The network status may be a simplified status, e.g., according to one of a few levels, such as green indicating normal operations, yellow indicating a partial compromise and/or anticipated impact, and red indicating a compromise to network equipment and/or a network service. Alternatively, or in addition, the network status may be more detailed, e.g., identifying particular slices, slice mappings, end-to-end services, QoS, and the like.

The process 280 evaluates, at 284, one or more first-responder service requirements in view of the network status. First-responder service requirements may include, without limitation, that network request be served in a timely manner. Alternatively, or in addition, the first-responder service requirements may include a predetermined network capacity, e.g., according to one or more of a network bandwidth, number of calls, QoS, and the like. In at least some embodiments, the first-responder service requirements may include a specified minimum portion of network resources to be maintained in a reliable manner for first-responder use, without regard to other network users.

The process 280, at 285, determines whether a first responder service is compromised. To the extent it is determined at 285 that the first responder service is not compromised, the process 280 continues, at 282, monitoring network condition(s). however, to the extent it is determined at 285 that the first responder service is compromised, the process 280, at 286, identifies one or more affected network elements and/or slices.

The process 280, at 287, identifies one or more alternate network elements and/or slices. Identification of alternative slices may be implemented according to a logic, e.g., first determining whether an alternate, existing slice has sufficient capacity to accommodate any first-responder requirements. If not, then the logic may next determine if a reserved pool of slices is available to accommodate the first-responder requirements. Alternatively, the logic may next consider whether any deployable assets may be available, e.g., determining a time of travel and/or setup should they be utilized to restore any compromised portions of the network.

The process 280, at 288, orchestrates an end-to-end network service path to accommodate the one or more first responder service requirements. The end-to-end network service path incorporates the one or more alternate network elements and/or slices.

In at least some embodiments, the process 280 includes a policy prioritizing user equipment of first responders. The policy may be implemented, at least in party, by the intelligent network slice controller 234 (FIG. 2B), e.g., by interacting with respective slice monitors 230, 232. Emergency call data flows of first responders, e.g., the second and third end-to-end, vertical flows 224b, 224c (FIG. 2A) may be localized and specifically forwarded via the alternative data paths 258a, 258b (FIG. 2B) towards the specific destination. According to the techniques disclosed herein, the alternate slice list may be dynamic and diverse. In at least some embodiments, the intelligent network slice controller 234 maintains a real time dynamic alternative network path topology table locally and/or by leveraging any remote, e.g., cloud-based arrangement to allow efficient determination of the option beyond normal available path due to infrastructure or natural disasters. The selected architecture data flow is used to describe how information, received from different parts and layers of the network, e.g., radio access inside, backhaul network links, emergency/high-priority service requests, etc., that can be further processed, towards an end-to-end policy enforcement, and in at least some instances, toward an optimization of a requirement, such as QoS, for different types of end user equipment and/or different types of services.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
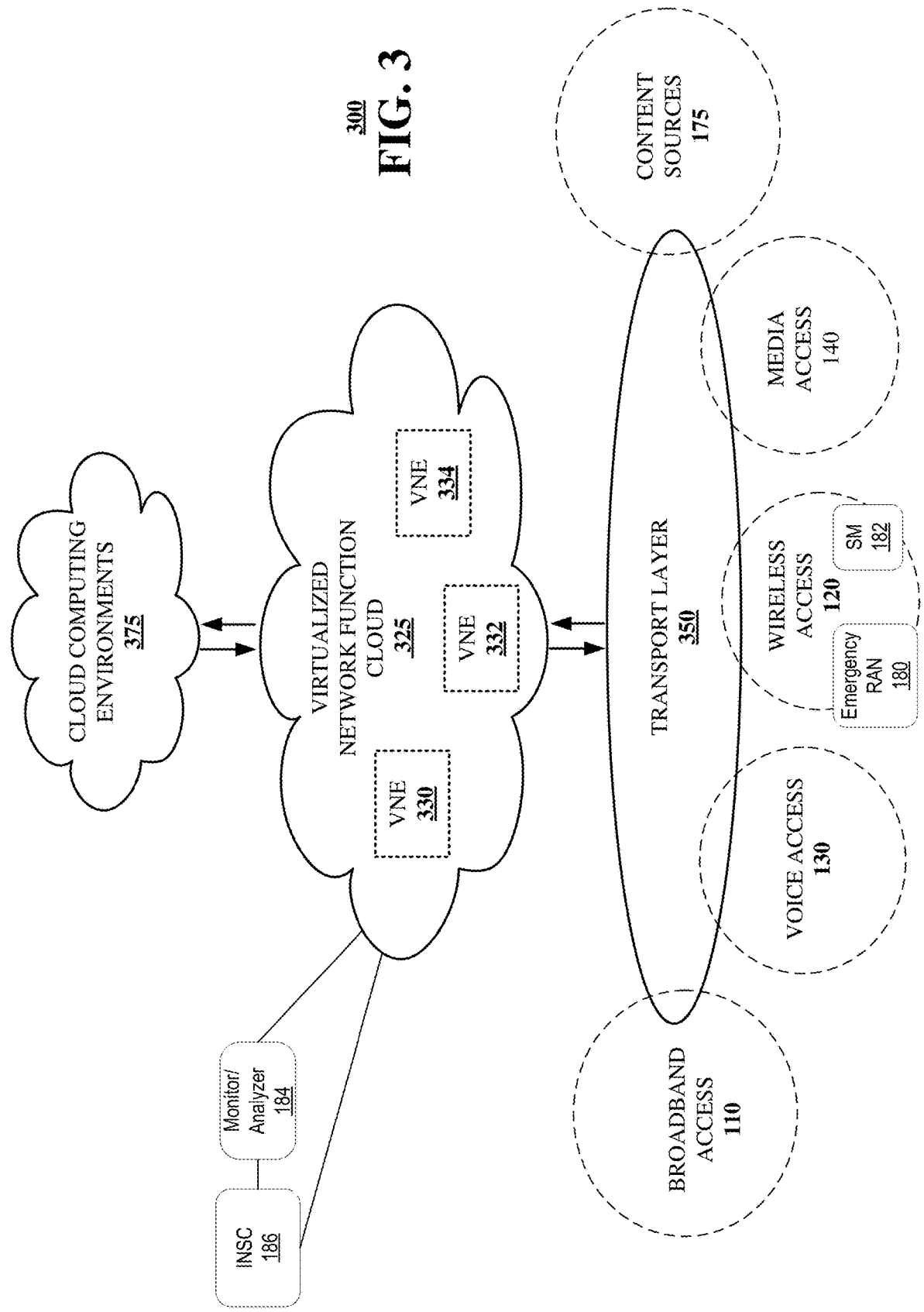
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of the communications network 100, the subsystems and functions of the resilient communication system 200, the resiliency and impact coordination system 247 and the network resiliency and impact coordination process 280 presented in FIGS. 1, 2A, 2B, 2C, and 3. For example, virtualized communication network 300 can facilitate in whole or in part monitoring status of a network that delivers services to user equipment including priority user equipment authorized according to a prioritized class of service that extends a reserved network capacity to ensure service availability. To the extent that the monitoring identifies a network condition that compromises the ensured service availability, integration of an alternate group of slices is orchestrated to replace the compromised group of slices to ensure service availability in view of the network condition.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
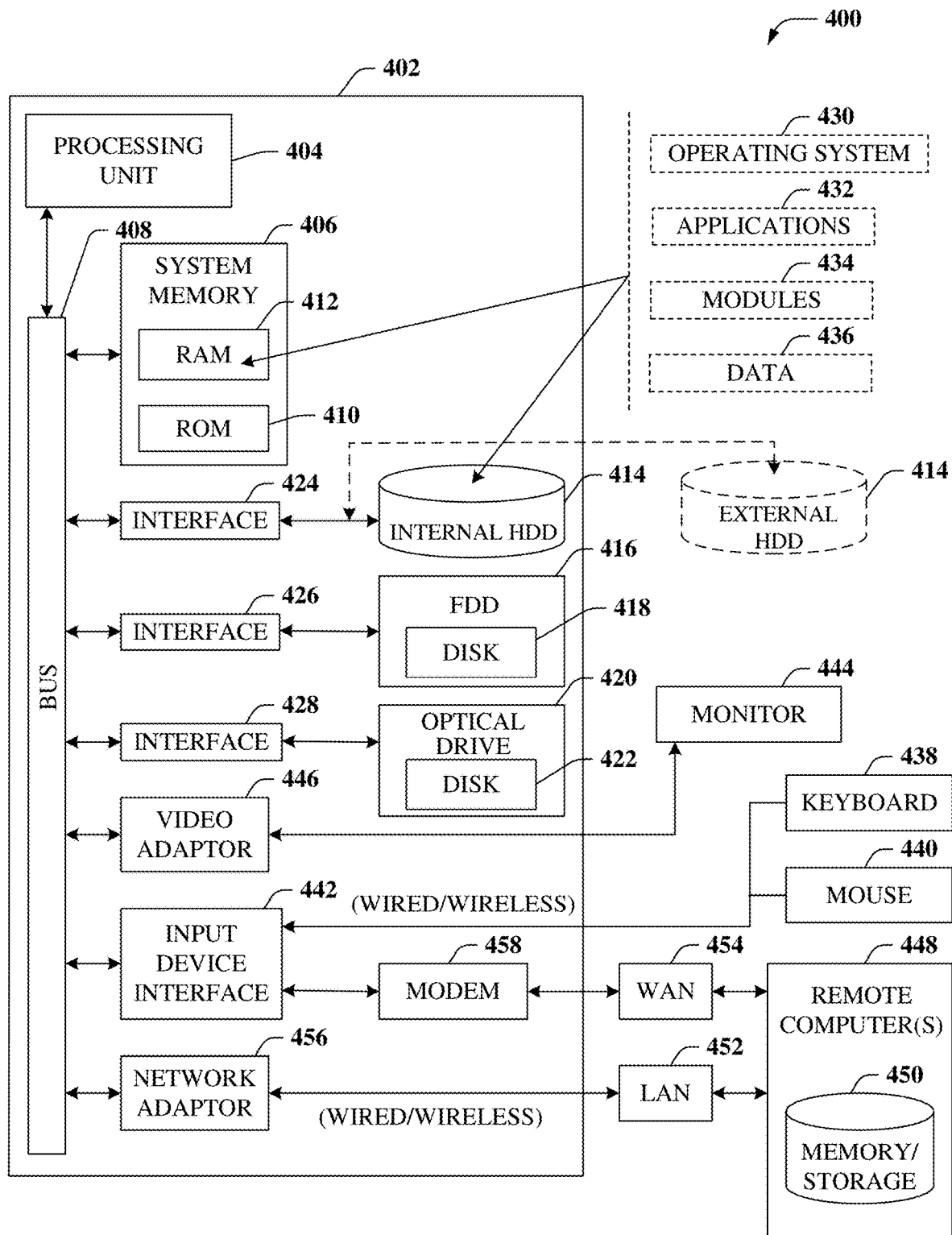
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part monitoring status of a network that delivers services to user equipment including priority user equipment authorized according to a prioritized class of service that extends a reserved network capacity to ensure service availability. To the extent that the monitoring identifies a network condition that compromises the ensured service availability, integration of an alternate group of slices is orchestrated to replace the compromised group of slices to ensure service availability in view of the network condition.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

The example virtualized communication network 300 may include a resiliency architecture that incorporates one or more of an intelligent network configuration controller 186, a network monitor 184, a slice manager 182 and/or an alternate resource pool 244 (FIG. 2B), such as an emergency RAN 180. The resiliency architecture may be implemented with dedicate equipment that may include systems specifically designed to perform their respective configuration control, monitoring, slice managing and/or emergency replacement. Alternatively, or in addition, resiliency architecture may be implemented with adaptable equipment that may be configured and/or otherwise orchestrated on an as-needed bases. Such systems may include one or more of SDN, VNF and/or cloud computing platforms.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
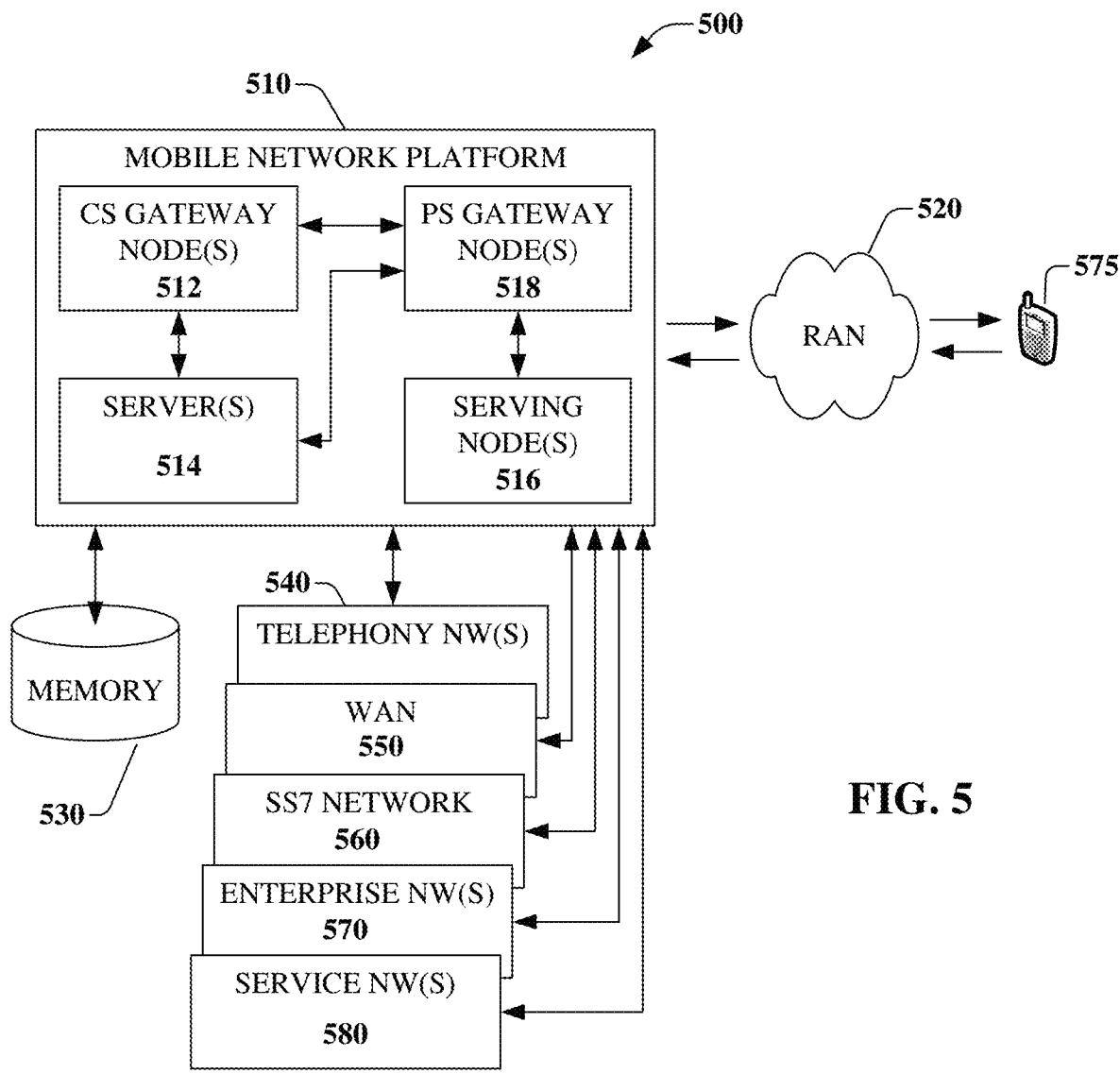
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part monitoring status of a network that delivers services to user equipment including priority user equipment authorized according to a prioritized class of service that extends a reserved network capacity to ensure service availability. To the extent that the monitoring identifies a network condition that compromises the ensured service availability, integration of an alternate group of slices is orchestrated to replace the compromised group of slices to ensure service availability in view of the network condition. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
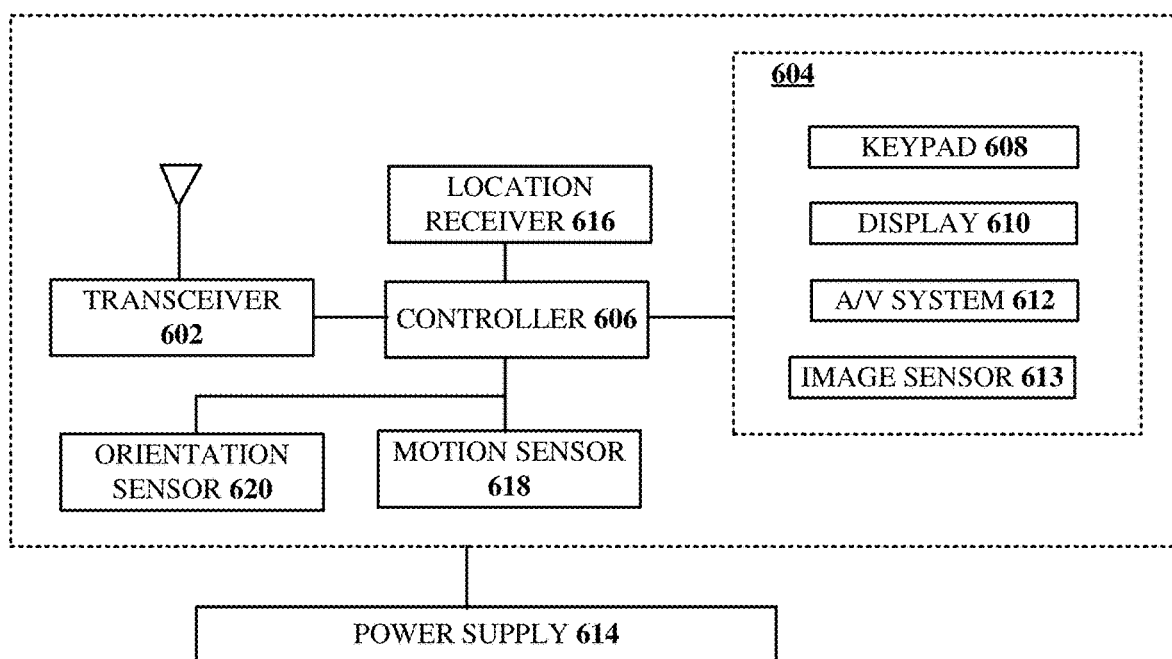
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part monitoring status of a network that delivers services to user equipment including priority user equipment authorized according to a prioritized class of service that extends a reserved network capacity to ensure service availability. To the extent that the monitoring identifies a network condition that compromises the ensured service availability, integration of an alternate group of slices is orchestrated to replace the compromised group of slices to ensure service availability in view of the network condition.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM, or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The techniques disclosed herein dynamically identify and/or otherwise select and/or orchestrate alternate, cross-segment end-to-end network slice(s) to support prioritized first-responder communications during any disaster and/or other condition, which could create surges in demand, possibly unexpected, and/or outages of one or more network segments. The disclosed dynamic, on-demand alternate network device and/or slice selection technique, as may be employed during congestion period and/or any natural disasters or malicious attacks, furthers an assurance by providing network resiliency to address any impacts that might otherwise jeopardize continuity of network connectivity services for the first responders.

It is perceived that the techniques disclosed herein may provide a unique network end-to-end slice management capability to extend communication services to a distinguishable and/or otherwise special class of users, such as the example first responders. This unique and a new capability for end-to-end network slice management may serve as a service differentiator for disaster recovery, by improving one or more of a QoS for mission critical services, customer satisfaction, network and/or service reliability. Moreover, the techniques disclosed herein may provide an architecture alternative offering opportunities for more advanced slicing features in end-to-end mobility, including 5G and 5G beyond. Alternatively, or in addition, the techniques disclosed herein provide an innovative network edge for service providers through advanced secure environment by leveraging quantum interface. It is understood that the techniques disclosed herein may support extensions to other services, such as smart cities, and serve as a viable alternative for secure communication in a war zone.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    monitoring, by a processing system including a processor, a status of a mobile network configured to provide end-to-end delivery of services to priority mobile devices authorized according to a prioritized class of service and other mobile devices not authorized for the prioritized class of service, wherein the prioritized class of service comprises a reserved network capacity, and wherein the end-to-end delivery of services utilizes a first network domain comprising a first plurality of network slices and a second network domain comprising a second plurality of network slices;
    detecting, by the processing system, a network interruption based on the status of the network, wherein the reserved network capacity is compromised by the network interruption;
    identifying, by the processing system, a compromised group of slices of one of the first network domain, the second network domain, or both, associated with the network interruption; and
    orchestrating, by the processing system, integration of an alternate group of slices into one of the first network domain, the second network domain, or both to replace the compromised group of slices, wherein the integration of the alternate group of slices restores the reserved network capacity for the end-to-end delivery of services to the priority mobile devices according to the prioritized class of service.

2. The method of claim 1, further comprising:
    distinguishing, by the processing system, the priority mobile devices associated with the prioritized class of service from other mobile devices not associated with the prioritized class of service.

3. The method of claim 2, wherein the distinguishing is based on a unique equipment identifier.

4. The method of claim 1, wherein the prioritized class of service comprises a first responder service configured to ensure availability of network capacity to priority mobile devices of first responder users.

5. The method of claim 1, wherein the network comprises a software defined network, and wherein the monitoring the status of the network further comprises receiving network status updates, wherein the status of the mobile network is based on the network status updates.

6. The method of claim 5, further comprising:
    applying, by the processing system, machine learning configured to determine the status of the mobile network based on the network status updates.

7. The method of claim 1, wherein the detecting the network interruption further comprises predicting, by the processing system, the network interruption to obtain a prediction, the network interruption based on the prediction.

8. The method of claim 1, further comprising:
    identifying, by the processing system, physically deployable network equipment; and
    identifying, by the processing system, a physical location associated with the network interruption, wherein the orchestrating the integration of the alternate group of slices further comprises initiating a deployment of the deployable network equipment to the physical location and configuring the deployable network equipment to provide a slice of the alternate group of slices.

9. The method of claim 8, wherein the physically deployable network equipment comprises a vehicle comprising a deployable radio access network.

10. The method of claim 9, wherein the vehicle comprises a drone.

11. The method of claim 1, wherein the first network domain comprises a radio access network and wherein the second network domain comprises a mobile core network.

12. A system, comprising:
    a processing system including a processor; and
    a memory that stores executable instructions that, when executed by the processing system, facilitate performance of operations, the operations comprising:
        monitoring operation of a communication network configured to provide end-to-end delivery of services to priority user equipment authorized according to a prioritized class of service and other user equipment not authorized for the prioritized class of service, wherein the prioritized class of service comprises a reserved communication network capacity, and wherein an end-to-end delivery of a service comprises a first communication network domain comprising a first plurality of network slices and a second communication network domain comprising a second plurality of network slices;

determining a communication network interruption based on the monitoring, wherein the reserved communication network capacity is compromised by the communication network interruption;

identifying a group of slices of one of the first communication network domain, the second communication network domain, or both, to obtain an identified group of slices associated with the communication network interruption; and providing an alternate group of slices configured for providing one of the first communication network domain, the second communication network domain, or both to replace the identified group of slices, wherein the alternate group of slices restores the reserved communication network capacity for the end-to-end delivery of services to the priority user equipment according to the prioritized class of service.

13. The system of claim 12, wherein the operations further comprise:

identifying user equipment as one of the priority user equipment associated with the prioritized class of service or the other user equipment not associated with the prioritized class of service.

14. The system of claim 13, wherein the identifying is based on a unique equipment identifier.

15. The system of claim 12, wherein the first communication network domain comprises a radio access network and wherein the second communication network domain comprises a mobile core network.

16. The system of claim 12, wherein the operations further comprise:

identifying physically deployable communication network equipment; and identifying a physical location associated with the communication network interruption, wherein the providing an alternate group of slices further comprises initiating a deployment of the physically deployable communication network equipment to the physical location and configuring the physically deployable communication network equipment to provide a slice of the alternate group of slices.

17. The system of claim 16, wherein the physically deployable communication network equipment comprises a vehicle comprising a deployable radio access network.

18. A non-transitory, machine-readable medium, comprising executable instructions that, when executed by a processing system including a processor, facilitate performance of operations, the operations comprising:

monitoring a status of a network configured to provide end-to-end delivery of services to priority user equipment authorized according to a prioritized class of service and other user equipment not authorized for the prioritized class of service, wherein the prioritized class of service comprises a reserved network capacity, and wherein an end-to-end delivery of a service comprises a first network domain comprising a first plurality of network slices and a second network domain comprising a second plurality of network slices;

determining a network interruption based on the status of the network, wherein the reserved network capacity is compromised by the network interruption;

identifying a compromised group of slices of one of the first network domain, the second network domain, or both, associated with the network interruption; and orchestrating an integration of an alternate group of slices into one of the first network domain, the second network domain, or both to replace the compromised group of slices, wherein the integration of the alternate group of slices restores the reserved network capacity for the end-to-end delivery of services to the priority user equipment according to the prioritized class of service.

19. The non-transitory, machine-readable medium of claim 18, further comprising:

distinguishing the priority user equipment associated with the prioritized class of service from other user equipment not associated with the prioritized class of service.

20. The non-transitory, machine-readable medium of claim 19, wherein the distinguishing is based on a unique equipment identifier.

* * * * *